United States Patent [19]

Munnerlyn

[11] 3,880,501
[45] Apr. 29, 1975

[54] OPTICAL SYSTEM FOR OBJECTIVE REFRACTOR FOR THE EYE

[75] Inventor: Charles R. Munnerlyn, Fairport, N.Y.

[73] Assignee: Tropel, Inc., Fairport, N.Y.

[22] Filed: May 17, 1974

[21] Appl. No.: 470,679

Related U.S. Application Data

[63] Continuation of Ser. No. 351,488, April 16, 1973, abandoned.

[52] U.S. Cl. .................... 351/8; 250/201; 250/225; 351/13; 351/14; 356/126; 356/132
[51] Int. Cl. .............................................. A61b 3/10
[58] Field of Search ......... 250/201, 225; 350/175 E; 351/6–9, 12–14, 16; 356/126, 132

[56] References Cited
UNITED STATES PATENTS
3,524,702    8/1970    Bellows et al. .................... 351/16 X Primary Examiner—Paul A. Sacher
Attorney, Agent, or Firm—Stonebraker, Shepard & Stephens

[57] ABSTRACT

An optical system for an objective refractor for the eye uses a source of light and a reticle for forming the light in a pattern, and a polarizing beam splitter directs a polarized portion of the light along a light path including a quarter-wave plate. Light reflected from the retina of the eye is directed back along the light path to the polarizing beam splitter, and a polarized portion of the reflected light is oriented by the quarter-wave plate to pass through the polarizing beam splitter on an output path directed away from the source. A light responsive device in the output path produces a usable output as a function of the focus of the reflected pattern, and the optical system can be applied to both manual and automatic refractors.

13 Claims, 2 Drawing Figures

OPTICAL SYSTEM FOR OBJECTIVE REFRACTOR FOR THE EYE

This is a continuation of application Ser. No. 351,488, filed April 16, 1973, and abandoned upon filing of this continuation application.

INVENTIVE IMPROVEMENT

The art has long sought an instrument for measuring the refraction of the eye objectively rather than subjectively through the examiner's and patient's experiences. There have been several suggestions for objective refractors for the eye, but for various reasons, none of these has been successful. One of the problems is that very little light can be reflected from the retina of the eye and used for an output, and reflections from other elements and light from other sources inevitably gets mixed with the light reflected from the retina so that a useful signal-to-noise ratio is difficult to obtain.

The invention involves a full analysis of the problems in objectively measuring the refraction of the eye and proposes an improved optical system that captures more reflected light from the retina than was previously possible and allows less noise light to be mixed with the retina reflection. The invention aims at a workable and practical instrument for objectively measuring refraction of the eye in a simple, effective, and economical optical system usable either with a manual or an automatic refractor.

SUMMARY OF THE INVENTION

The inventive optical system for an objective refractor for the eye uses a source of light and a reticle forming the light in a pattern, and a polarizing beam splitter directs a polarized portion of the light along a light path aligned with the eye and including optical elements, one of which is movable, along the light path. A quarter-wave plate is positioned on the light path; light reflected from the retina of the eye is directed back along the light path to the polarizing beam splitter, and a polarized portion of the light reflected from the retina is oriented by the quarter-wave plate to pass through the polarizing beam splitter on a output light path directed away from the source. A light responsive element in the output path produces a usable output as a function of the focus of the reflected pattern.

DRAWINGS

FIG. 1 is a perspective schematic view of the operation of the inventive optical system; and FIG. 2 is a schematic, elevational view of a preferred embodiment of the invention.

DETAILED DESCRIPTION:

Figure 1:
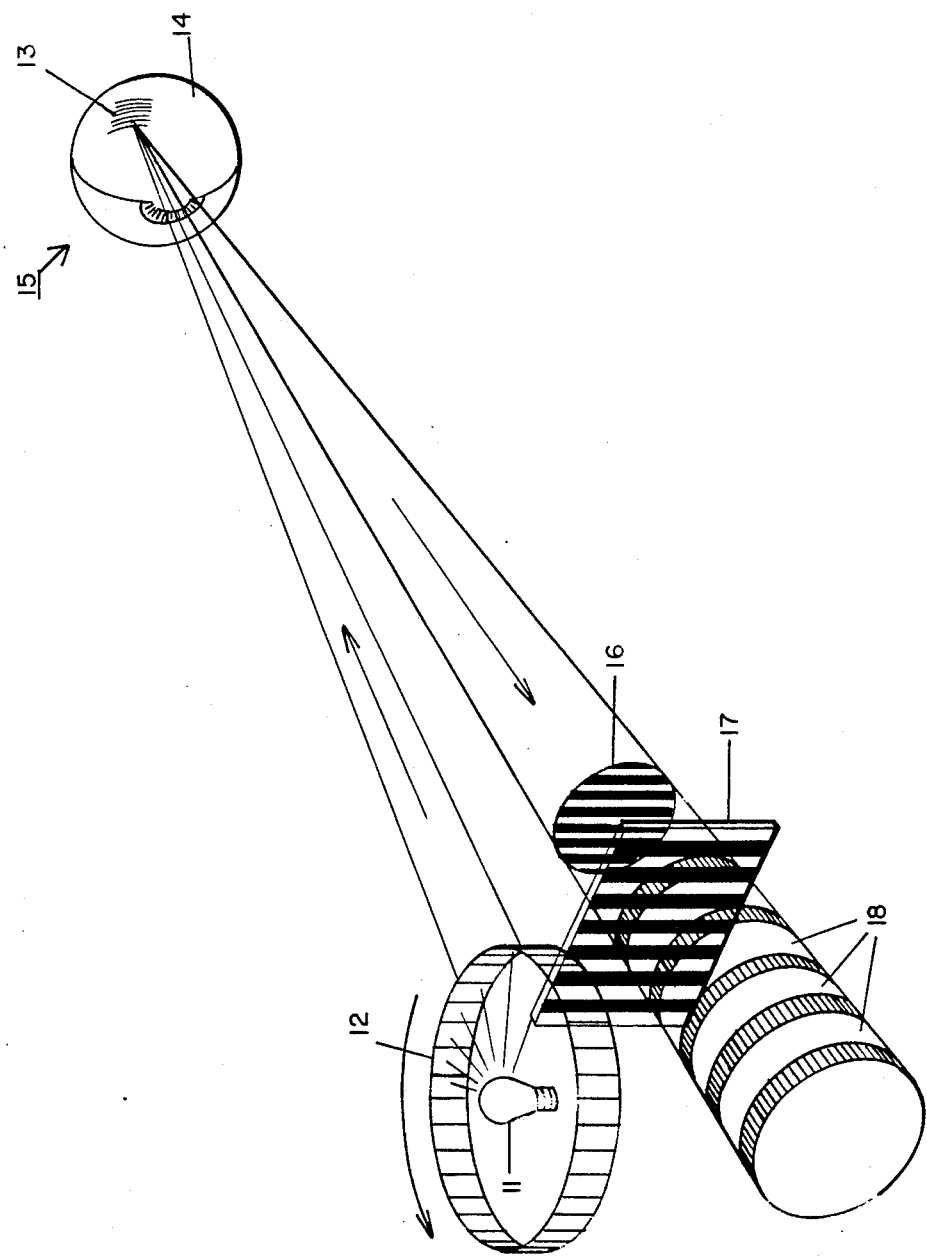
Figure 2:
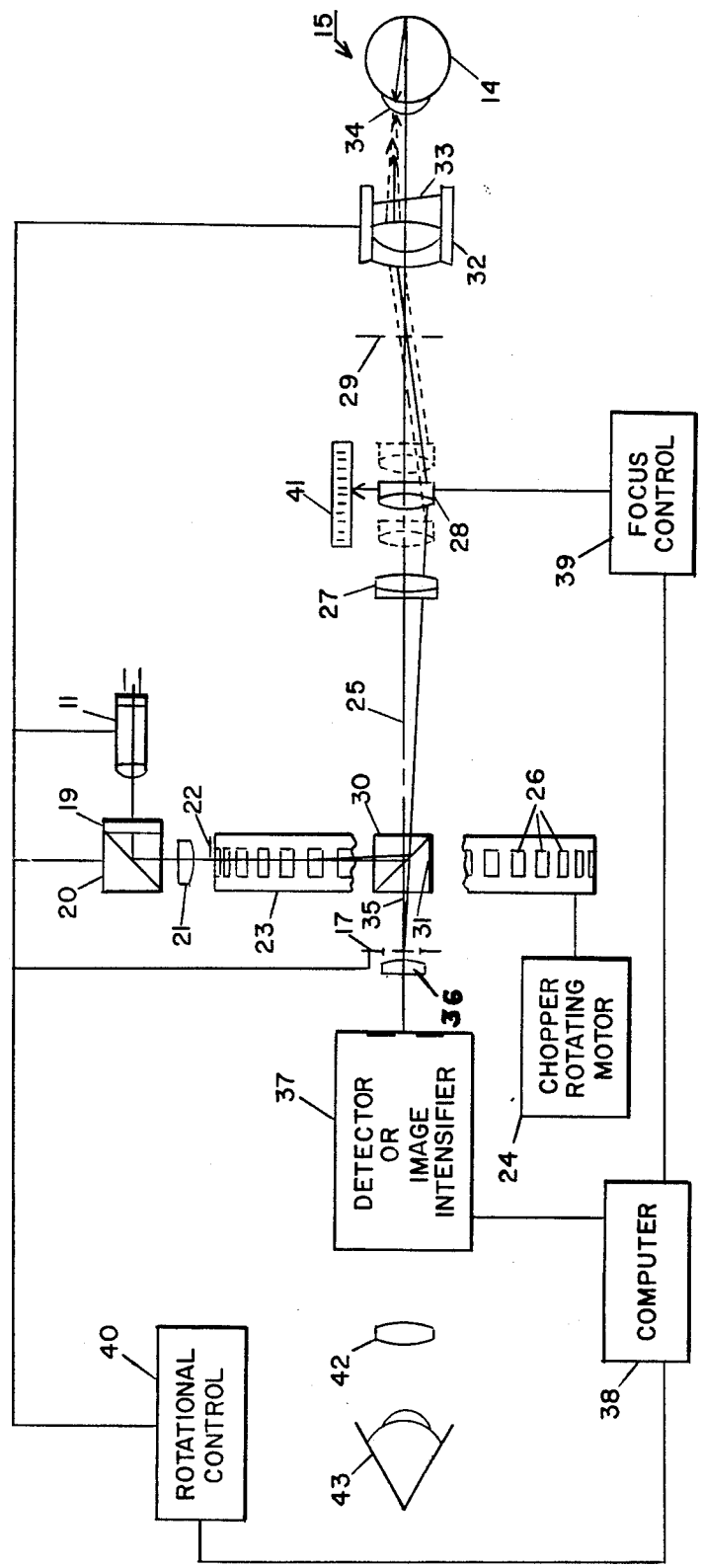

The inventive optical system can be applied to either a manual or automatically operated refractor; and FIG. 2 shows elements of each, and FIG. 1 schematically shows the operation of an automatic version. Light from a source 11 passes through a rotating chopper 12 to form a pattern of moving light bars 13 directed onto the retina 14 of an eye 15. The reflected pattern of moving bars 16 passes through a fixed mask 17 having stationary bars corresponding to bar pattern 16. This produces a pulsating or wave-type signal 18 that increases and decreases while the bar pattern 16 moves over the mask 17. Signal 18 is also a function of the focus of bar pattern 16, because sharply focused bars in pattern 16 produce maximum brightness for signal 18 and poorly focused bars in pattern 16 produce a less intense signal 18.

The inventive optical system for producing the results shown in FIG. 1 involves several refinements and improvements over previous attempts at objective refractors for the eye, and these are best shown in FIG. 2 which will be explained first relative to automatic operation and then for manual operation.

Source 11, either alone or in combination with a filter 19 preferably produces infra red or near infra red light. This has several advantages because it is not visible to the eye, does not constrict the pupil of the eye, and generally helps the eye relax during the examination. Light from lamp 11 is directed to a polarizer or a polarizing beam splitter 20 that polarizes about half of the incident light and directs polarized light through condenser lens 21, a field stop 22, and a reticle 23 formed as a chopper drum coaxial with light path 25 and rotatably driven by motor 24. Reticle drum 23 has uniform slots 26 preferably evenly spaced apart by the slot width so as to chop the light into a pattern of moving bars equally spaced by the bar width. Reticle 23 could also be formed as a rotating disk or as a fixed reticle accompanied by another moving element used as a chopper, but reticle drum 23 is a simple and efficient expedient compared to alternatives.

The polarized light passing through reticle drum 23 is incident on polarizing beam splitter 30 on optical path 25 and is oriented so that nearly all the light is directed along path 25 toward eye 15. Source 11 could direct unpolarized light directly onto polarizing beam splitter 30 for a similar effect, but there are several advantages in using a polarizer or polarizing beam splitter 20. For compact design, it is preferable to arrange lamp 11 as illustrated, and if polarizing beam splitter 20 were not used, a mirror would be required at the same position to direct the light to polarizing beam splitter 30. Using polarizing beam splitter 20 instead of a mirror and preliminarily polarizing the light increases the completeness of the polarization when the polarized light passes through polarizing beam splitter 30. Also, since beam splitter 30 cannot be completely efficient, some light passes straight through in the direction of incidence and is reflected back from bottom surface 31. However, use of polarizing beam splitter 20 gives a polarization orientation to any such stray light so that it passes back through beam splitter 30 toward beam splitter 20 rather than along output light path 35. This helps reduce noise light in output path 35.

The polarized, infra red light passing along path 25 is collimated by collimator lens 27 and then passes through an axially movable focusing lens 28. A field stop 29 and an eyepiece 32 are also arranged on light path 25, and eye 15 is set at a predetermined distance from eyepiece 32. The optical surfaces in elements 27, 28 and 32 are specularly reflective and could reflect light back toward output path 35. To reduce this to a minimum, all the surfaces of elements 27, 28 and 32 are preferably designed so that no substantial surface area is perpendicular to incident light to allow any substantial reflection.

A quater-wave plate 33 is arranged between eye 15 and the lenses in eyepiece 32, and is preferably mounted in eyepiece 32 as the last optical element before light reaches eye 15. Plate 33 is also preferably tilted by a small acute angle from a plane perpendicular to path 25 so that any specularly reflected light from plate 33 is directed off of path 25.

Light passing through quarter-wave plate 33 is incident on the cornea 34 of eye 15, and some light is reflected from cornea 34. However, cornea 34 is curved and disperses reflected light widely so that only a small portion off any light reflected from cornea 34 travels back along optical path 25. The light passing through the pupil of eye 15 is directed toward retina 14 in a variable focus that depends on the refraction characteristics of eye 15 and the position of focusing lens 28.

The prior art contains suggestions that light reflected from retina 14 is diffused and generally unpolarized. This has prompted suggestions for using polarizers oriented to obstruct any polarized reflected light from retina 14 and pass only unpolarized, diffusely reflected light. However, experience with the invention has shown that a substantial amount of polarized light is reflected from retina 14 and can be used along the unpolarized, diffusely reflected light to form an output signal. The use of polarized reflected light as well as unpolarized reflected light greatly increases the signal-producing capacity of the inventive optical system, and quarter-wave plate 33 and polarizing beam splitter 30 cooperate to make this possible.

Quarter-wave plate 33 produces phase changes in polarized light passing through in either direction and in effect changes the resultant orientation of polarized light reflected from retina 14 from the orientation of the polarized light leaving beam splitter 30. For example, if the polarized light leaving beam splitter 30 is horizontally oriented, phase changes produced by passing twice through quarter-wave plate 33 reorients the polarization of reflected light to vertical as the light travels back to beam splitter 30. Any horizontally polarized light reflected back to beam splitter 30 from any specularly reflective surface along light path 25 is directed toward beam splitter 20 and source 11 rather than to output path 35, but vertically oriented polarized light from retina 14 passes straight through beam splitter 30 along output path 35. Also, unpolarized, diffusely reflected light reaching beam splitter 30 is split so that part returns toward source 11 and part passes along output path 35. This allows substantially all of the polarized reflected light from retina 14 to reach output path 35 along with a substantail portion of unpolarized, diffusely reflected light from retina 14. The total light available in output path 35 is then sufficient to produce a usable output or signal.

Bar mask 17 is positioned on output path 35 along with a focusing lens 36 directing the light into a photo mulitplier tube 37 or other detector responsive to light. The reflected reticle pattern of moving bars passing over mask 17 produces a signal as a function of the focus of the reflected pattern. In automatic operation, the signal detected by tube 37 is fed to a computer 38 that analyzes the results and controls the movement of focusing lens 28, preferably through a stepping motor 39.

To rotate the orientation of the light bar pattern produced by reticle drum 23 relative to eye 15, source 11, beam splitters 20 and 30, eyepiece 32, and mask 17 are all connected together for rotation around the axis of light path 25. A rotational control motor 40 preferably accomplishes the angular setting of these elements under the direction of computer 38.

In operation, the optical system is aligned with eye 15 which is relaxed to gaze at infinity, computer 38 selects pattern orientation angles through rotational control motor 40 and moves focusing lens 28 along light path 25 while monitoring the output signal from detector 37 to investigate objectively the refraction characteristics of eye 15. Various pattern angles and positions of focusing lens 28 are used until the examination is complete.

For manual operation, chopper reticle 23 is replaced by a reticle that can be combined with field stop 22 as a flat disk having a patterned aperture. Such a disk can have a pattern presenting different angles to the eye or can be rotatable around the axis of the output light from polarizer 20 to change the angle of a bar pattern relative to eye 15. Focusing lens 28 is moved manually and its position is noted by use of a scale 41. Mask 17 is removed, and if infra red light is used, detector 37 is replaced by an image intensifier viewed through an eyepiece 42 by an operator 43. The image intensifier makes the infra red light visible to operator 43 who observes the sharpness of focus of the reflected pattern and moves focusing lens 28 to achieve optimum focus at ddifferent meridians. He then analyzes the results to determine the refraction characteristics of eye 15 objectively rather than through the subjective experience of himself and the patient.

The inventive optical system can also be used to investigate the shape or condition of the retina and to examine an eye for other characteristics. Manual operation is much less expensive than automatic and is more accurate and reliable than subjective methods, but automatic operation can be made very rapid and accurate. Computer 38 is preferably a digital computer but can also be an analog device, and the inventive optical system is compatible with several prior art devices for measuring refraction of the eye.

Persons wishing to practice the invention should remember that other embodiments and variations be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the variations possible in adapting the invention to different circumstances.

I claim:

1. In an optical system for an objective refractor for the eye including a source of radiant energy formed in a pattern directed along a path aligned with said eye, optical elements along said path for varying the angle of incidence of said radiant energy on said eye, and a detector for receiving radiant energy reflected from the retina of said eye for producing a useable output as a function of the focus of said reflected radiant energy, the improvement comprising:

a. a polarizing beam splitter arranged for receiving said radiant energy from off the axis of said path and directing a polarized portion of said radiant energy along said path through said optical elements toward said eye, said radiant energy reflected from said eye travelling back along said path and being incident on said polarizing beam splitter; and b. means between said optical elements and said eye for altering said polarization of said radiant energy so said polarization of said polarized radiant energy reflected from said eye is oriented to pass straight through said polarizing beam splitter to said detector.

2. The system of claim 1 wherein said polarization altering means is a quarter-wave plate.

3. The system of claim 2 wherein said quarter-wave plate is oriented relative to said polarizing beam splitter to produce the maximum of said useable output.

4. The system of claim 3 wherein said quarter-wave plate is oriented for rotating the polarization of said radiant energy reflected from said eye by about 90° relative to said radiant energy directed toward said eye by said polarizing beam splitter.

5. The system of claim 1 including another polarizing beam splitter arranged for initially polarizing a portion of said radiant energy and directing polarized radiant energy to said first mentioned polarizing beam splitter.

6. The system of claim 1 wherein said polarization altering means is a quarter-wave plate and including a reticle formed as a rotatably driven, slotted drum coaxial with said path for forming said radiant energy into said pattern, a mask positioned between said polarizing beam splitter and said detector and having a pattern corresponding to said reticle pattern, and means for angularly adjusting said polarizing beam splitter, quarter-wave plate, and said mask together around said path axis for rotating said pattern relative to said eye.

7. The system of claim 6 including another polarizing beam splitter arranged for initially polarizing a portion of said radiant energy and directing polarized radiant energy to said first mentioned polarizing beam splitter.

8. The system of claim 7 wherein said quarter-wave plate is oriented relative to said polarizing beam splitter to produce the maximum of said useable output.

9. The systm of claim 8 wherein said quarter-wave plate is oriented for rotating the polarization of said radiant energy reflected from said eye by about 90° relative to said radiant energy directed toward said eye by said polarizing beam splitter.

10. The system of claim 6 including a computer receiving said output from said detector.

11. The system of claim 10 including means controlled by said computer for accomplishing said angular adjustment of said polarizing beam splitter, said quarter-wave plate, and said mask around said path axis.

12. The system of claim 11 including another polarizing beam splitter arranged for initially polarizing a portion of said radiant energy and directing polarized radiant energy to said first mentioned polarizing beam splitter.

13. The system of claim 12 wherein said quarter-wave plate is oriented relative to said polarizing beam splitter to produce the maximum of said useable output, and also oriented for rotating the polarization of said radiant energy reflected from said eye by about 90° relative to said radiant energy directed toward said eye by said polarizing beam splitter.

* * * * *